Patented Mar. 6, 1923.

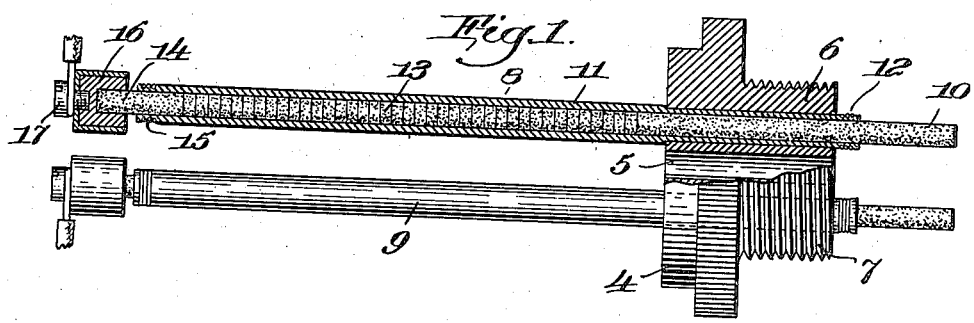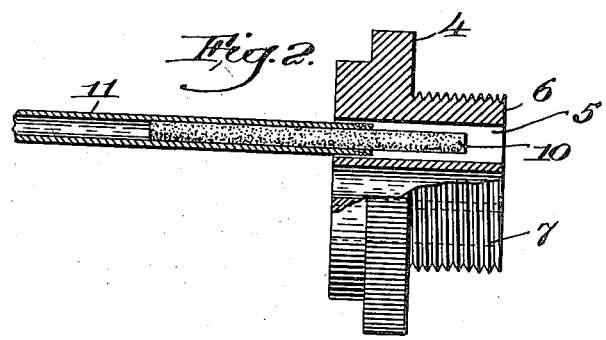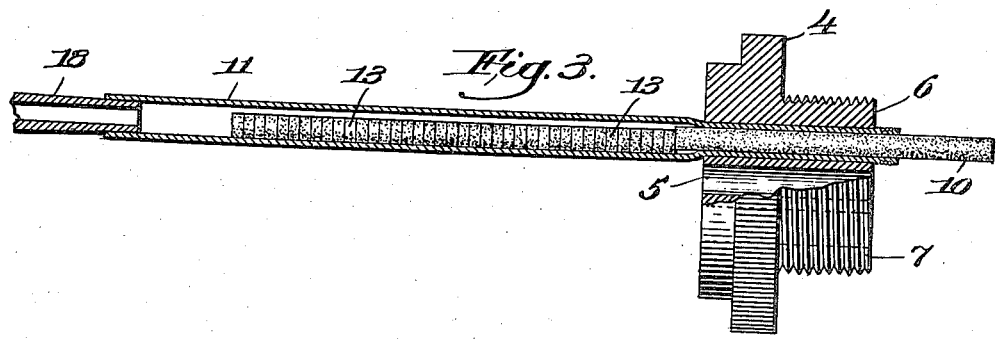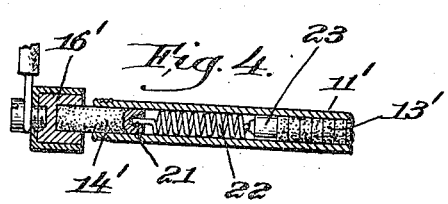

1,447,357

UNITED STATES PATENT OFFICE.

DAVID R. PRICE, OF NEWTONVILLE, MASSACHUSETTS, ASSIGNOR OF ONE-HALF TO LELAND POWERS, OF NEWTONVILLE, MASSACHUSETTS.

FLEXIBLE ELECTRODE.

Application filed February 13, 1920. Serial No. 358,494.

*To all whom it may concern:*

Be it known that I, DAVID R. PRICE, citizen of the United States of America, and resident of Newtonville, in the county of Middlesex and State of Massachusetts, have invented new and useful Improvements in Flexible Electrodes, of which the following is a specification.

This invention relates to an improved non-corrosive and flexible electrode.

While adapted for general use wherever electrodes of such characteristics may be desirable, it is of particular application in connection with the device for determining the liquid level in storage batteries which I have described and claimed in application Serial No. 358,495, filed on even date herewith.

In the construction of an electrode for use in connection with storage batteries or the like, the electrode must be constructed of material inert in sulphuric acid or in similar electrolytes. Storage batteries give off fumes from the electrolyte, especially during the charging of the battery, which fumes are highly corrosive in action so that it is essential that the connection of the usual metallic conductor to the electrode take place at a point relatively remote from the point of discharge of the fumes. In order to carry out this last requirement it is highly desirable that the electrode itself be flexible since storage batteries are very generally located in restricted spaces. A solid electrode extending away from the battery proper would be easily broken and therefore unreliable.

It is an object of my invention to provide a flexible electrode formed of material which is normally inert in sulphuric acid or similar electrolytes and to provide such an electrode which may be easily and cheaply constructed of material which may be readily obtained. It is also an object of the present invention to provide a new and improved method of forming and assembling such electrodes. Other and further objects will appear as the description proceeds.

I have shown a preferred embodiment of my invention in the accompanying drawing in which, Figure 1 is a view partly in section showing my improved electrode assembled in a battery cap;

Figure 2 is a view illustrative of the method of assembling the electrode in the cap, Figure 3 is a view illustrative of the method of assembling the several parts of the electrode; and Figure 4 is a sectional view of a modified form of electrode.

In the drawings the cap 4 is provided with the usual vent 5 and in addition thereto the two spaced openings 6 and 7 for passage of the electrodes 8 and 9 respectively. These two electrodes are identical in construction as shown, but this is not essential. The contact portion of the electrode is a carbon rod 10, and surrounding the upper portion of this rod is the elastic insulation 11, the end of which is maintained fixed to the rod by the tie 12. In the elastic insulation tube are the carbon discs 13 which are in contact with each other, with the rod 10, and with the connector rod 14 which extends beyond the end of the insulation tube and is held in place by the tie 15. Cast on the end of rod 14 is the metallic terminal 16 having the binding screw 17.

In assembling the electrode and the cap, the rod 10 is first inserted in the tube and tied at 12. The tube 11, which is preferably formed of resilient and elastic rubber, is stretched and its diameter is thereby reduced so that the tube and rod may be readily inserted in the cap as is clearly shown in Fig. 2.

The stretch of the tube is now temporarily released and the carbon discs 13 are inserted in the tube. The nozzle 18 of an air-supply tube is then inserted in the other end of the tube, as indicated in Fig. 3 and the tube is inflated sufficiently to keep the inner side of the tube out of contact with the carbon discs 13, and the tube is again stretched, inflation meanwhile being maintained sufficiently to keep the walls out of contact with the discs. After the stretching is completed, the air pressure is released whereupon the tube contracts into intimate gripping contact with the carbon discs 13. The force putting the tube under tension is next released, but owing to the grip of the tube upon the elements 13 the tube remains under a permanent tension which forces the several elements 13 and the rod 10 into intimate contact. The rod 14, upon which the terminal 16 has preferably already been cast is now inserted in the open end of the tube with sufficient force to insure firm contact with the adjacent disc 13 and the tube is fastened to the rod by the tie 15. Enough residual tension remains in the tube 11 to hold the discs in contact with each other and with the rods 10 and 14.

The completed electrode now is firmly seated in the cap 4 and is flexible so that it may be readily bent in any desired direction. The resiliency of the tube 11, together with its residual tension, is sufficient to maintain the carbon elements in intimate contact, and it may or may not be sufficient to cause the electrode to return to the straight position when it is released after having been flexed.

In the form shown in Fig. 4, the electrode consists of a flexible tube 11', carbon discs 13', connector member 14' and terminal 16'. Having an end leaded into the member 14' at 21 is the conducting spring 22, the other end of which is soldered to a brass disc 23. It will be seen that in this form of the device the carbon elements are maintained in contact by the force of the spring 22 and hence the tube 11' need not be under tension and consequently may be made of a cheaper grade of stock. Also its manufacture may be carried out with fewer steps the inflation and stretching of the tube not being necessary.

The length of the electrode obviously may be varied to suit the conditions to be met. The contact portion of the electrode is preferably formed of carbon but it may be formed of any material which is normally inert in sulphuric acid or similar electrolytes. The tube 11 may be formed of any elastic and flexible material but I have found rubber tubing of stock similar to that used for pneumatic inner tubes to be very satisfactory for the purpose.

The rubber and the carbon are not affected by sulphuric acid or similar electrolytes and the flexibility of the electrode permits it to be bent so that the metallic terminal is away from the vent of the battery, and also away from the battery terminals, and yet permits the electrode to be fitted into the usual confined battery box.

I claim:

1. An electrical transmitter comprising conductive material divided into parts, and a non-conductive but flexible material under tension for maintaining the parts in contact, whereby flexing of the transmitter will not cause separation of the conductive material.

2. An electrical transmitter comprising conductive but inflexible material, inert to acids, and divided into parts, and a non-conductive but flexible material, inert to acids, for maintaining the parts in contact.

3. An electrical transmitter comprising a core of conductive but inflexible material inert to acids and divided into parts, and a non-conductive but flexible casing, inert to acids for maintaining the parts in contact.

4. An electrical conductor comprising a core formed by a plurality of members and an elastic casing under tension adapted for gripping the members, to hold the members in contact whereby flexing the conductor will not break the contact of its members.

5. An electrical conductor comprising a core formed by a plurality of members, and an elastic casing adapted for gripping the members, said casing being placed under an initial tension for holding the members in contact whereby the members of the core will be held in contact when the conductor is flexed.

6. An electrode comprising a row of conducting elements, a flexible casing surrounding said elements, and means interposed between the casing and the opposite ends of said row for holding the elements together in response to tension in the casing.

7. An electrode comprising a row of conducting discs, a flexible elastic casing surrounding said discs, and means interposed between the casing and the opposite ends of said row for holding the discs together in response to tension in the casing.

8. An electrode comprising a row of carbon discs, a tubular rubber casing surrounding said discs, and means interposed between the casing and the opposite ends of said row for holding the discs together in response to tension in the casing.

9. An electrode comprising a plurality of inflexible conducting elements, a flexible casing surrounding said elements, and means interposed between the casing and the elements at opposite ends thereof whereby said elements are maintained in contact with one another when the electrode is flexed.

10. An electrode comprising a row of conducting elements, an elastic casing surrounding said elements, end members to which the opposite ends of the casing are attached whereby the elements are maintained in contact with each other and with the end members in response to tension in the casing, one of said end members serving as a terminal for an electric circuit.

11. An electrode comprising a row of conducting elements, an elastic casing surrounding said elements, end members to which the opposite ends of the casing are attached whereby the elements are maintained in contact with each other and with the end members in response to tension in the casing, one of said end members serving as a terminal for an electric circuit, the other end member being adapted to extend into an electric storage battery through a bore in the plug thereof.

12. The method of forming a flexible electrode which consists in placing a plurality of longitudinally disconnected conductors in a tube in such manner that the tube has gripping contact with said conductors, and placing the tube under initial tension whereby the tension will maintain the conductors in intimate engagement.

13. The method of forming a flexible electrode which consists in placing a plurality of longitudinally disconnected conductors in a resilient tube in such manner that the tube has gripping contact with said conductors, temporarily removing the tube from contact with the conductor and while so removed longitudinally stretching it, whereby when the tube again grips the conductors its elasticity will force the conductors into intimate contact.

14. The method of assembling a flexible electrode which consists in attaching a flexible, stretchable tube to a contact member, placing a plurality of separate conductors in said tube, attaching the other end of the tube to a source of compressed air, inflating the tube sufficiently to remove it from gripping contact with the conductors therein, stretching the tube, releasing the air pressure so as to permit the tube to again come in gripping contact with the conductors, releasing the tube from the stretching force whereby the tube will tend to return to its normal length, thereby forcing the conductors into intimate engagement, the gripping of the tube upon the conductors maintaining the tube under tension, and inserting a connector member in the open end of the tube, forcing it into intimate contact with the adjacent conductor and attaching the end of the tube to said connector member.

Signed by me at Boston, Massachusetts, this 6th day of February, 1920.

DAVID R. PRICE.